C. W. CRAWFORD.
SHOCK ABSORBER.
APPLICATION FILED MAY 4, 1911.

1,060,537.

Patented Apr. 29, 1913.

Witnesses
Frank Waterfield
C. N. Gatchel

Inventor
Cary W. Crawford
By Orpham
Attorney

UNITED STATES PATENT OFFICE.

CARY W. CRAWFORD, OF LOS ANGELES, CALIFORNIA, ASSIGNOR TO EUREKA SHOCK ABSORBER COMPANY, OF LOS ANGELES, CALIFORNIA, A CORPORATION OF CALIFORNIA.

SHOCK-ABSORBER.

1,060,537.  Specification of Letters Patent.  Patented Apr. 29, 1913.

Application filed May 4, 1911.  Serial No. 624,922.

*To all whom it may concern:*

Be it known that I, CARY W. CRAWFORD, a citizen of the United States, residing at the city of Los Angeles, county of Los Angeles, State of California, have invented new and useful Improvements in Shock-Absorbers, of which the following is a specification.

Figure 1:
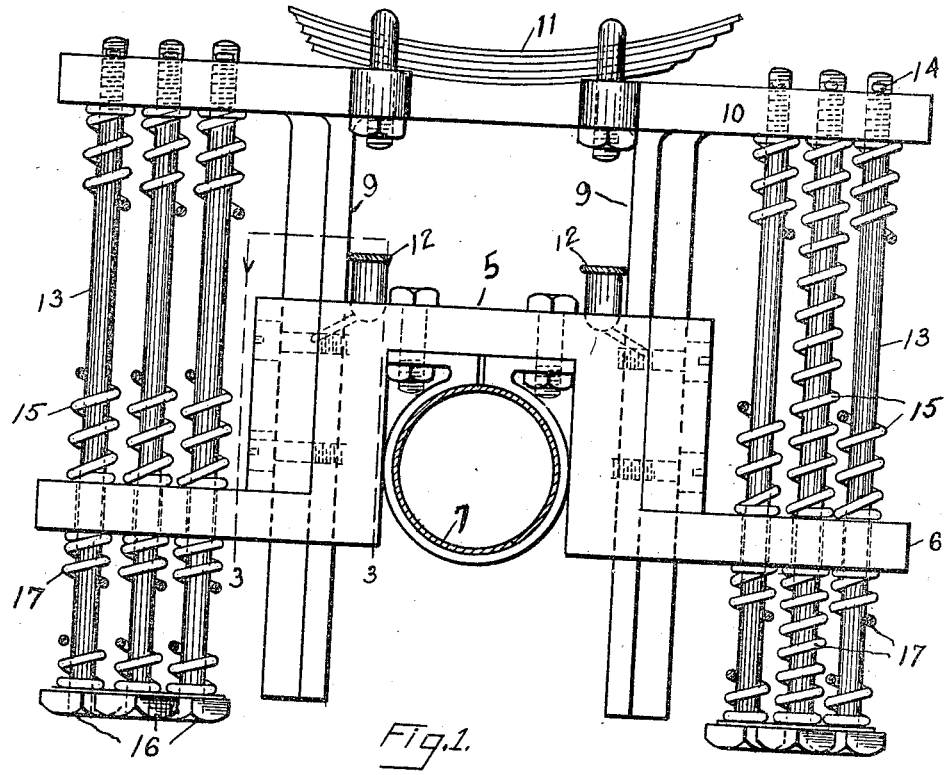
Figure 2:
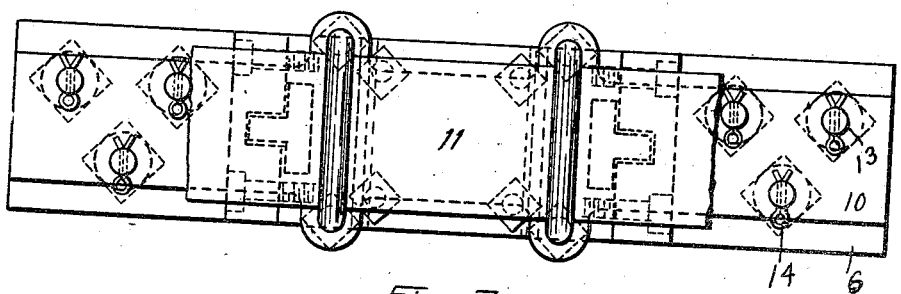
Figure 3:
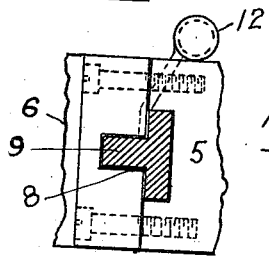

My invention relates to a shock absorber for that class of wheeled vehicles in which the load carrying body is supported by springs carried by the running gear, and the object is to prevent an objectionable recoil when such vehicle passes over an obstruction or into a rut. I accomplish this object by the device described herein and illustrated in the accompanying drawings, in which:

Figure 1 is side elevation of my shock absorber; Fig. 2 is a top plan of the parts shown in Fig. 1; Fig. 3 is a sectional detail on the line 3—3 of Fig. 1.

In the drawings 5 is a U-shaped body having side wings 6 which is secured upon the axle 7 of the vehicle in the place of the ordinary springs thereof, and may be termed the axle frame. In the body are the T-shaped vertical guide ways 8, in which are slidably mounted the leg members 9 of the spring frame 10, to which are secured the ordinary vehicle springs 11. The body and spring frame are preferably of cast steel. Oil cups 12 are provided to lubricate the legs of the spring frame in their movement through the body.

In the spring frame are screwed a plurality of bolts 13, which pass through holes in the wings of the axle frame. After these bolts are screwed into place, cotter pins 14 hold them against accidental disengagement. Mounted on these bolts, between the spring frame and axle frame, are the shock springs 15. Between the heads 16 of the bolts and the axle frame are mounted rebound springs 17, which prevent an excessive action of the main springs when the vehicle passes over an obstruction.

It will be understood that the shock and rebound springs are compressed slightly when positioned for use and that the number of such springs depends upon the strength thereof and the character of the vehicle, whether light or heavy. I prefer a considerable number rather than a smaller number of greater strength, as a more mobile shock absorber is thereby provided.

Having described my invention, what I claim is:

1. A shock absorber, comprising an axle frame having vertical openings therethrough when positioned for use and a spring frame having legs, said legs being movable through the vertical openings in the axle frame, shock springs between said frames and rebound springs below the axle frame; and bolts passing through the springs and axle frame and secured to the spring frame; and means to secure said axle frame upon the axle.

2. The combination, in an apparatus for counteracting or cushioning vibrations between the body and the running gear of wheeled vehicles of a spring frame having T-shaped legs; an axle frame comprising a U-shaped body having side wings, said body having T-shaped vertical guide ways therein, said wings having vertical holes therethrough; bolts passing through said wings and into and secured to said spring frame, said bolts having heads below said wings; rebound springs on said bolts between the heads thereof and the wings, shock springs on said bolts between said wings and the spring frame; and means to secure said axle frame upon the axle.

In witness that I claim the foregoing I have hereunto subscribed my name this 29th day of April, 1911.

CARY W. CRAWFORD

Witnesses:
 JOHN M. NUTT,
 G. L. CLARK.